June 17, 1958  J. F. LENGYEL  2,838,769
WASTE FITTING ASSEMBLY
Filed April 12, 1955

INVENTOR
John F. Lengyel
BY
H. F. Johnston
ATTORNEY

United States Patent Office 2,838,769
Patented June 17, 1958

2,838,769

WASTE FITTING ASSEMBLY

John F. Lengyel, Cheshire, Conn., assignor to Scovill Manufacturing Company, Waterbury, Conn., a corporation of Connecticut Application April 12, 1955, Serial No. 500,869

4 Claims. (Cl. 4—287)

This invention relates to waste fitting assemblies for sinks and the like including a combination strainer basket and stopper.

One type of combination sink strainer basket and stopper in common use, wherein the stopper is mounted on a stem axially movable relative to the basket, requires that the stopper be elevated and turned to register with some support element on a drain outlet member in order to hold the stopper in drain open position, and a similar operation is required to lower the plug to drain closed position. This was always accomplished by a trial and error operation to register the hidden cooperating parts to position the stopper in open or closed position. Another type of combination strainer basket and stopper, wherein the stopper is made secure to the basket, requires that the basket be oriented to register or unregister with support elements on the drain outlet member.

It is an object of this invention to provide a combination strainer basket and stopper wherein the strainer basket is itself so formed as to cooperate with the drain outlet member to retain the basket and stopper in desired position without springs or other delicate parts and in which the basket and stopper as a unit is shifted from one position to another by a simple push or pull movement.

Other objects, novel features and advantages of the invention will become apparent from the following specification and accompanying drawing, wherein.

Figure 1:
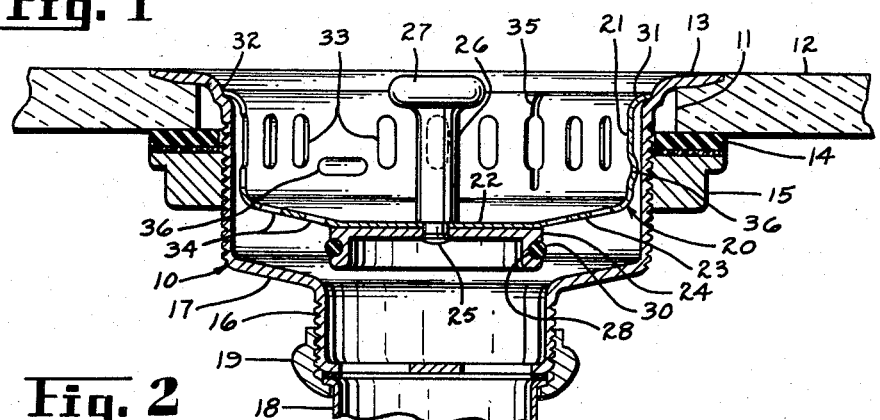
Fig. 1 is a vertical sectional view taken through a sink drain construction showing the improved strainer basket and stopper assembly according to the present invention as it appears in drain-open position.

Referring more particularly to the drawing, the numeral 10 designates a housing or body shell adapted to be fitted into an opening 11 of a sink base 12. The upper end of the shell 10 is formed with an outward flange 13 that rests against the upper surface of the sink base 12 and is clamped thereagainst by the usual sealing gasket 14 and nut 15, the latter having threaded engagement with the exterior threaded surface of the shell 10. The housing shell 10 has a reduced drain-outlet section 16 at its lower end that connects to the larger part of the shell 10 by a conical connecting wall 17. The reduced section 16 is joined to a drain pipe 18 in the usual manner by a coupling nut 19.

A strainer basket 20 of cup-shaped form is removably mounted in the housing 10 and consists of a cylindrical side wall 21 and a bottom consisting of a flat base 22 joined to the cylindrical side wall 21 through a conical section 23. A plug or stopper 24 is secured against the underside of the basket base 22 by the riveted end 25 of a lift stem 26 having a handle knob 27 at its upper end.

Figure 2:
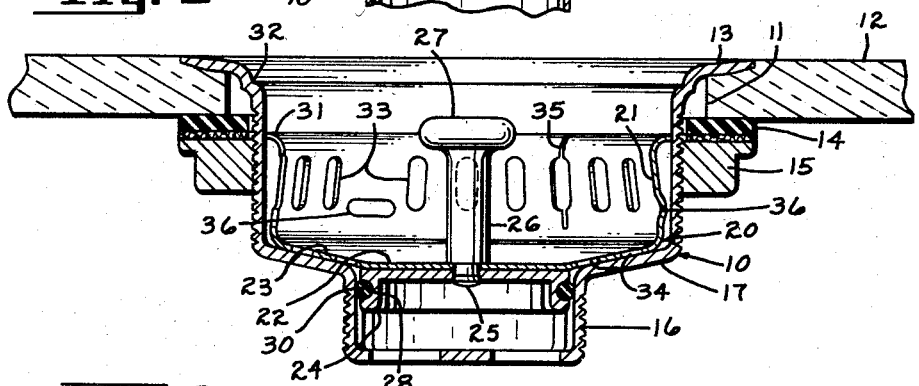
Fig. 2 is a similar view showing the parts in drain-closed position.
Figure 3:
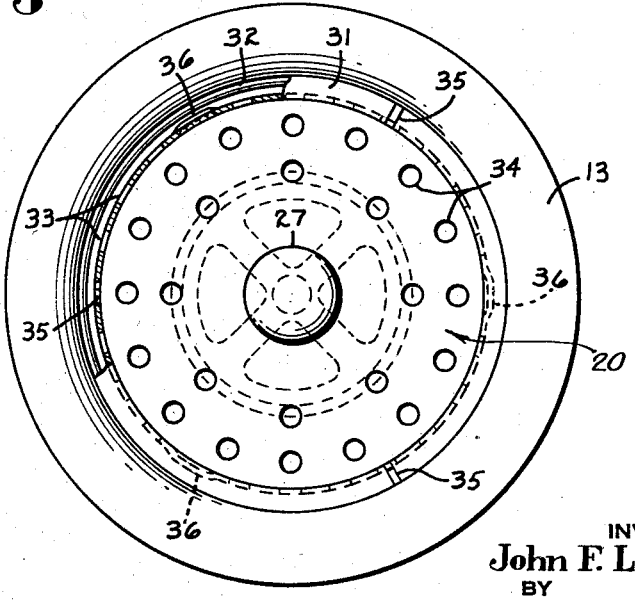
Fig. 3 is a plan view of the unit as it appears in Fig. 1, with a portion of the strainer basket in section.

The stopper 24 is of novel construction in that it does not require a machined or tapered valve seat which is the common practice in conventional drain outlets. Specifically the stopper 24 is an inverted cup-shaped member having a circumferential groove 28 in its outer surface in which is fitted a ring 30 of resilient material such as rubber. The plug 24 with its ring 30 telescopes into the reduced cylindrical section 16 of the drain outlet when the basket 20 is forced to its lowermost position as seen in Fig. 2 and establishes a leakproof seal.

The side wall 21 of the strainer basket 20 has its upper edge formed outwardly to provide a lip 31 that normally rests against an annular shoulder 32 provided on the housing 10 at about the point where the flange 13 joins said housing. The wall 21 of the strainer basket 20 is provided with a series of elongated drain openings 33 while the conical section 23 is provided with a series of round drain openings 34. The wall of the basket 20 is also provided with a plurality of axially extending narrow slots 35, three in this instance, that preferably intercept a like number of elongated drain openings 33 and extend through the periphery of the lip 31 thus dividing the basket side wall 21 into three resilient sections. As noted in Fig. 1 the normal diameter of the basket lip is slightly greater than the internal diameter of the housing 10, and the external diameter of the strainer basket 20 relative to said housing 10 is such as to leave ample drainage clearance therebetween. Elongated ribs 36 are formed outwardly of the strainer basket 20 below the openings 33 and preferably are arranged on a horizontal plane and serve to stabilize or guide the basket by preventing its tilting relative to the housing 10.

The edges of the lip 31, or the surface of the shoulder 32 or both are downwardly inclined so that the lipped edges will cam inwardly and release from said shoulder when the basket is pushed down.

In the operation of the device, to close the drain outlet it is only necessary to push downwardly on the handle knob 27 until the basket conical section 23 rests against the housing conical wall 17 which will thus position the stopper 24 within the reduced section 16. This operation will cause the basket lip 31 to cam inwardly off of the shoulder 32 and frictionally engage against the inner wall surface of the housing by reason of the resilient character of the divided sections of the basket wall. To open the drain outlet it is only necessary to pick up the unit by the handle knob 27 until the basket lip 31 springs outwardly and rests upon the housing shoulder 32 as seen in Fig. 1.

While the form of the invention herein shown and described embraces a preferred embodiment of the same, it is to be understood that the construction may be varied as to mechanical details without departing from the spirit of the invention and the scope of what is claimed.

I claim:

1. A waste fitting assembly comprising a cylindrical cup-shaped body shell having an upper flange, an annular shoulder adjacent said flange and a lower reduced outlet portion, a cup-shaped strainer basket having a perforated bottom and a cylindrical side wall, a stopper positioned against the underside of said basket, a lift stem, means for riveting said lift stem, stopper and strainer basket together as an integral unit, said basket having an out-turned lip at its upper edge that rests upon said annular shoulder on the body shell when elevated to hold said strainer basket and plug in drain open position, the cylindrical wall of said basket having a series of elongated drain openings and also provided with equally spaced slits extending through the upper lip to divide the basket wall into resilient sections, said shoulder and said lip having cooperating cam portions so shaped that the lipped edges of said resilient sections will move inwardly and be released from said shoulder when the basket is forced downwardly.

2. A waste fitting assembly as defined in claim 1 wherein the cylindrical wall of basket is provided with outwardly extending projections adjacent the bottom of said basket which in conjunction with the lipped edges serve to guide the basket during its up and down movement within the body shell.

3. A waste fitting assembly for a sink comprising a cup-shaped body shell having a cylindrical sidewall, an outwardly extending flange at the top adapted to rest against the surface of a sink and a bottom outlet portion of reduced diameter adapted for connection with a drain pipe, a strainer basket of cup-shaped form having a perforated cylindrical sidewall of substantially smaller diameter than the sidewall of the shell, a stopper attached to the bottom of the basket, an outwardly flaring lip around the top of the basket which is of larger diameter than the I. D. of the body shell, the sidewall of the basket having at least three vertically extending slits which extend continuously through the lip portion to divide the sidewall into at least three resilient sections, the undersurface of the lip and the upper edge of the cylindrical wall of the shell having cooperating camming surfaces so that the lip edges of the resilient sections of the strainer basket will cam inwardly and slide along the inner surface of the shell when the basket is pushed down to a position where the stopper closes the outlet.

4. A waste fitting assembly for a sink comprising a cup-shaped body shell having a cylindrical sidewall, an outwardly extending flange at the top adapted to rest against the surface of a sink, an annular shoulder around the top of said sidewall below the level of said flange, a bottom outlet portion of reduced diameter adapted for connection with a drain pipe, a strainer basket of cup-shaped form having a perforated cylindrical sidewall of substantially smaller diameter than the sidewall of the shell, a stopper attached to the bottom of the basket, an outwardly flaring lip around the top of the basket which is of larger diameter than the I. D. of the body shell which lip rests upon said shoulder in supporting the basket in open position, the sidewall of the basket having at least three vertically extending slits which extend continuously through the lip portion to divide the sidewall into at least three resilient sections, the undersurface of the lip and the upper edge of the cylindrical wall of the shell having cooperating camming surfaces so that the lip edges of the resilient sections of the strainer basket will cam inwardly and slide along the inner surface of the shell when the basket is pushed down to a position where the stopper closes the outlet, and outward projections formed out of the sidewall of the basket adapted to bear against the inner surface of the shell to prevent substantial angling of the basket when moved upwardly and downwardly.

References Cited in the file of this patent

UNITED STATES PATENTS

| | | |
|---|---|---|
| 1,937,609 | Tompkins | Dec. 5, 1933 |
| 2,296,527 | Kuhnle | Sept. 22, 1942 |
| 2,481,312 | Kirschner | Sept. 6, 1949 |
| 2,572,101 | Bloch | Oct. 23, 1951 |
| 2,668,962 | Spector | Feb. 16, 1954 |